UNITED STATES PATENT OFFICE.

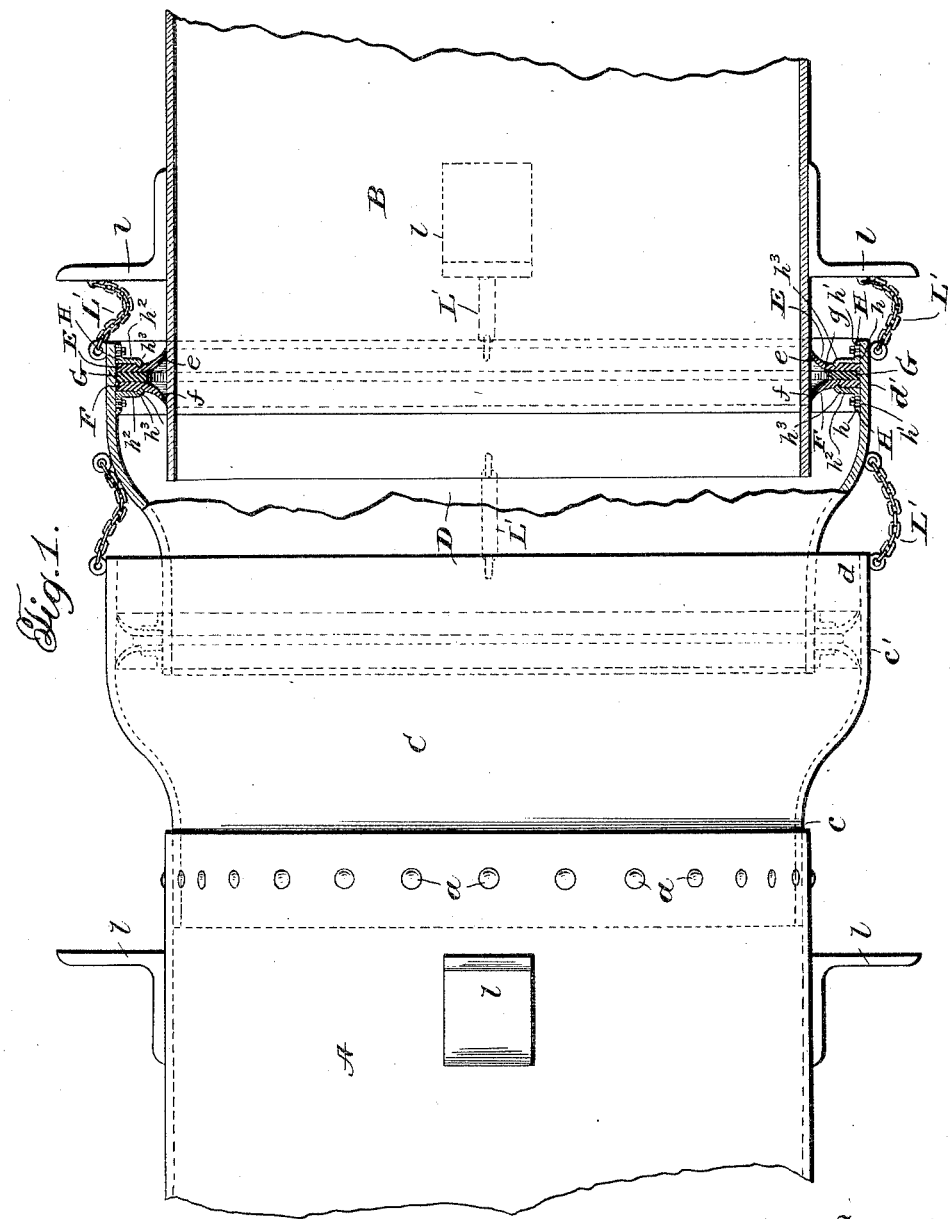

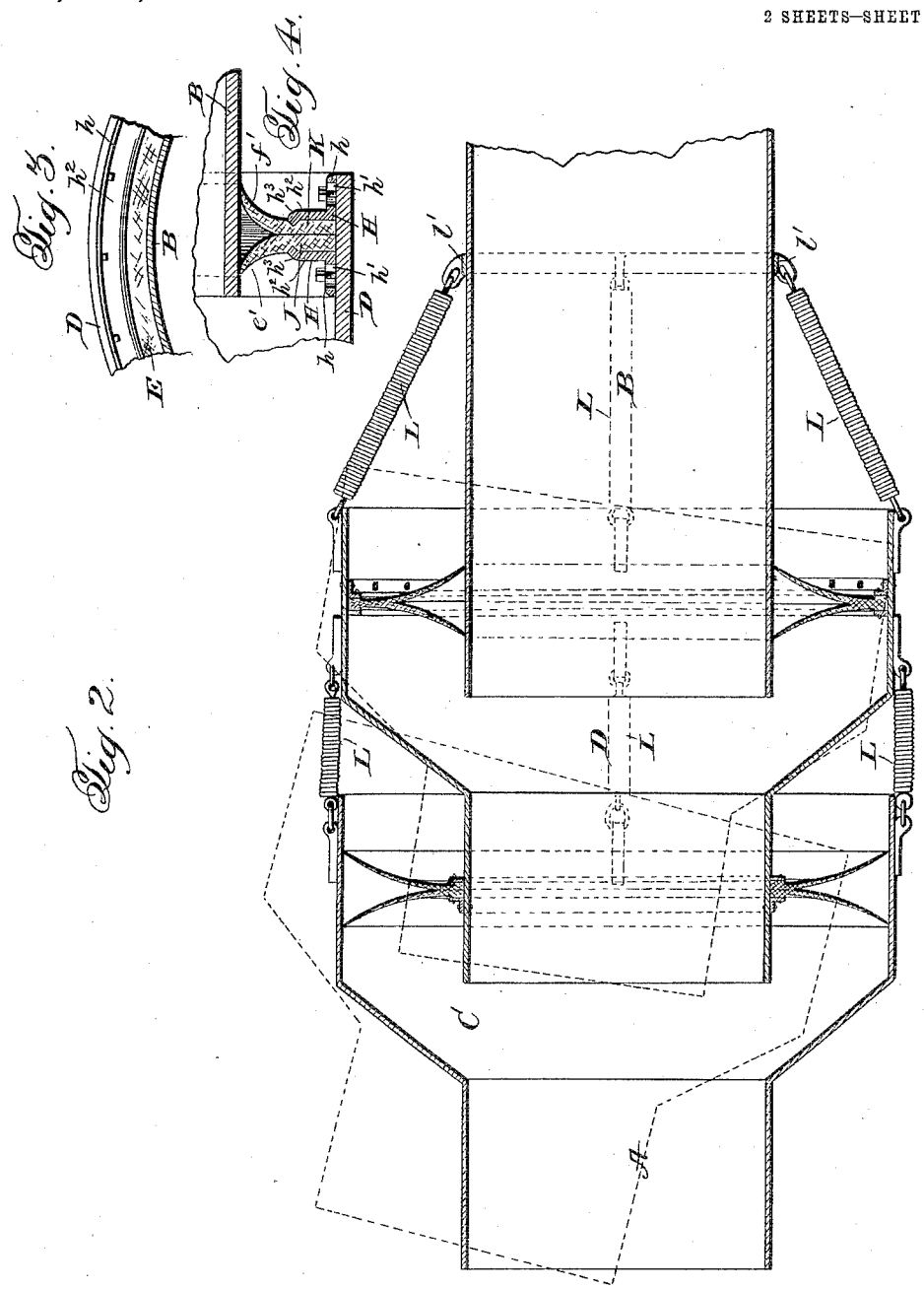

EDWARD F. BERRY, OF NEW ORLEANS, LOUISIANA.

DREDGING DEVICE (COUPLING.)

1,076,738.  Specification of Letters Patent.  Patented Oct. 28, 1913.

Application filed October 29, 1912.  Serial No. 728,515.

*To all whom it may concern:*

Be it known that I, EDWARD F. BERRY, a citizen of the United States, residing at New Orleans, in the parish of Orleans and State of Louisiana, have invented certain new and useful Improvements in Dredging Devices (Coupling) of which the following is a specification, reference being had therein to the accompanying drawing.

This invention relates to improvements in dredging devices, and more particularly to a flexible joint or coupling for the usual discharge pipes. These pipes ordinarily consist of a plurality of sections of a length found expedient, the adjacent sections being connected together in a manner to enable relative deflection of the sections to permit a yielding or self-adjusting movement of the pipe when supported upon the surface of the water, and also a similar adjustment of the pipe in keeping with irregular ground surfaces over which the same may lie, and to permit the bending or turning up of the end of the pipe to a floating boat or dredging machine.

Heretofore in the art it has been common to connect the adjacent ends of discharge pipes by coupling members packed to seal the joints and to permit limited relative movement of the sections, and as distinguished from the older type of devices referred to, a fundamental characteristic of the present invention resides in the association of parts permitting a very substantial play or movement between the sections in a horizontal or vertical and other directions, while preserving a sealed relation between the sections, the degree of play or movement depending upon the proportioning of the parts in keeping with the conditions surrounding the use to which the discharge pipe is to be put.

Another important feature of the present improvements is the provision, in conjunction with the sealing means between the sections, of a buffer or shock absorbing instrumentality capable of taking up the jar and relieving the concussion incident to excessive deflection or movement of the pipe sections tending to make the adjacent ends of the pipes (usually of metal) strike each other, and at times with considerable force sufficient to injure the pipe sections.

The invention still further comprehends the provision of an improved type of packing permitting a sliding relation between the packing and associated pipe sections to accommodate for the changing horizontal or vertical relations of the pipe sections while at the same time maintaining the sealing relation between both the depressed and extended portions of the packing and the pipe sections with which the packing members engage.

The invention still further comprises means for flexibly connecting the pipe sections together to prevent excessive separation of the same longitudinally under unusual strains, and tending to draw the sections together when the strains become abated.

Additional details in the construction and arrangement of parts will be apparent from the specific description hereinafter contained when read in connection with the accompanying drawings forming part hereof, and wherein the preferred embodiment of the invention is illustrated. However, it will be apparent to persons skilled in the art to which the invention appertains that the invention is capable of embodiment in other forms and devices than that especially illustrated.

In the drawings: Figure 1 is a side elevation of a dredging pipe, the sections of which are coupled together with my improved flexible joint, one of the joints being shown in section; Fig. 2 is an enlarged longitudinal sectional view through one of the flexible joints showing the same in a deflected position; Fig. 3 is a transverse fragmentary sectional view showing the manner of securing one of the packing members in place, and Fig. 4 is a similar sectional view showing packing members adapted to be used in lieu of the packing of the preceding views without a separate or intermediate buffer or shock absorbing element.

Referring more specifically to the drawings, wherein like reference characters designate corresponding parts in the several views, A and B represent two metallic pipe sections of which a dredge discharge pipe is formed, any desired number of these sections being employed, and C and D are the main coupling members between the said pipe sections A and B. The coupling sections are of what may be termed sinuous formation (either curved as shown in Fig. 1 or angular as shown in Fig. 2) provided with a relatively contracted end portion $c$, $d$ and a relatively enlarged opposite end portion $c'$, $d'$. One of these members, for instance C, at its smaller end $c$ is integral with or fits closely within the adjoining end of the pipe section A and is firmly riveted or otherwise fastened thereto, as at $a$. The coupling member D is what might be said to be a floating or free element, adapted, in coöperation with the parts immediately associated therewith, to permit a wide range of adjustment or deflection of the pipe sections in substantially all directions, particularly horizontally and vertically, more usually required as an incident to the particular use in connection with which these dredge discharge pipes are employed. The free or floating member D of the joint carries exteriorly at its contracted end $d$ and interiorly at its enlarged end $d'$ like packing elements to which I will now refer, a description of one of these elements sufficing for both in view of the fact that the details of construction are the same in each instance, the difference therebetween resting solely in the fact that one packing member engages the inner surface of the enlarged end $c'$ of the coupling member C, while the other engages the outer surface of the end of the pipe section B, for example.

E and F are rubber rings secured at their inner edges as will presently appear and having flexible diverging outer edges constituting a flaring engagement with the surface against which these rings abut. The substantial diverging of these rings so that they have extended surface engagement as at $e$, $f$, will, as is obvious, permit considerable play or movement between the coupling members so that the packing rings at one portion thereof may be considerably depressed (enabled by their sliding engagement with the surface normally engaged thereby) while other portions will be automatically extended owing to the widening of the space between the pipe sections, insuring at all times, throughout the extent of the packing members and coupled pipe sections, a sealed engagement between the parts. In some instances but one of the packing rings will be necessary at each end of the so-called "floating" coupling member.

A characteristic of the improved packing above defined resides in the fact that the inner packing ring of the cupped or dished formation shown projects with its free marginal edge toward the outlet end of the pipe, or in the direction of flow of material through the pipe, and is exposed to the pipe contents so that internal pressures operating against said free marginal edge and in the cup will assist in pressing the packing against the members to which it is opposed and secure a firm sealing engagement therebetween against the escape of said pipe contents.

The pipe sections and coupling members being formed of metal, and it being realized that at times under maximum relative deflection of said members, the metal members are liable to forcibly contact and thus become damaged, I have appreciated the desirability of providing in addition to the packing member E or F or both, an additional shock absorbing element G, which is in the nature of a flat ring and may be formed of heavy rubber or other tough cushioning substance capable of taking up the jar or concussion incident to the blows between the parts. The flat ring is preferably (though not necessarily) interposed between the packing members E and F and projects for a material distance, as indicated at $g$ outwardly beyond a common securing means for the packing E, F and buffer G. This securing means comprises oppositely disposed rings H, one or both of which is of angular cross section to provide securing flanges $h$ slotted as at $h'$ adapted to be secured by bolts or otherwise against the surface of the coupling member D, the slots $h'$ enabling adjustment of the fastening rings so as to forcibly engage and bind the packing rings E and F and the buffer ring G together, the flanges $h^2$ of the fastening rings having flat inner surfaces constituting substantial bearing surfaces against the packing rings E and F and the terminal or outer marginal portions of the flanges $h$ being provided with a rib or turned inwardly as at $h^3$ beyond the flat bearing surfaces of the flanges so as to be embedded in the packing rings E and F and buffer G, thus constituting an adequate interlock between the packing rings and buffer and between them and the fastening rings H to permanently secure the parts together. The slots $h'$ in the fastening rings enable a substantial range of adjustment so that packing rings and buffer members of varying thicknesses in keeping with requirements may be easily introduced between the fastening rings and secured in place thereby. While both rings H are shown as slotted and adjustable, it will be appreciated that one ring may be stationary and the other ring adjustable toward and from the same.

In some instances, it is possible to dispense with the buffer ring G, and I find that a good construction is furnished by utilizing packing rings J and K having tapered outer edges $e'$ and $f'$, to give the flexibility desired of the sealing portions of the packing rings, the inner portions of these members *j*, *k* being substantially thickened to enable the proper fastening of the same in place as heretofore pointed out, and to give an adequate amount of body to the rubber or other substance, so that the packing rings themselves may at times serve as a buffer to resist ordinary shocks under sudden excessive deflection of the pipe sections. Some means should, however, preferably be employed to prevent elongation of the discharge pipe tending to result in the separation of the flexible coupling members and pipe sections, and to offer proper resistance in that particular, as well as serving to restore the parts to normal position, I furnish strong springs L or chains L' between the movable sections, for example, between the end of the coupling member D and the end of the pipe section B, suitable brackets *l* or a ring *l'* being furnished on the latter for this purpose; and between the coupling members C and D as shown. The opposite pipe section A is also provided with brackets *l* or a ring *l'* enabling the assembling of the flexible coupling with the pipe sections A and B in a relation the reverse of that previously described.

It will be obvious that springs such as are shown in Fig. 2 of the drawings could readily be used in place of the chains L' just above described.

I claim:

1. In combination with a pipe section, a coupling member associated therewith overlapping the same, and a packing in the space between the overlapping portions of the pipe section and coupling member comprising flexible wings disposed edgewise radially of the coupling member and occupying a spreading relation to each other to engage the surface of the member opposed thereby at correspondingly separated points, substantially as described.

2. In combination with a pipe section, a coupling member associated therewith overlapping the same, and a packing in the space between the overlapping portions of the pipe section and coupling member, said packing comprising a pair of flexible rings disposed edgewise radially of the coupling member and having free edge portions occupying a diverging relation and engaging the surface of the member which it opposes, and means on the other member for securing the packing means in place.

3. In combination with a pipe section, a coupling member associated therewith overlapping the same, and a packing in the space between the overlapping portions of the pipe section and coupling member, said packing comprising a pair of flexible rings disposed edgewise radially of the coupling member and having free edge portions occupying a diverging relation and engaging the surface of the member which it opposes, and means on the other member for securing the packing means in place, said means comprising fastening rings between which the flexible packing rings are held.

4. In combination with a pipe section, a coupling member associated therewith overlapping the same, and a packing in the space between the overlapping portions of the pipe section and coupling member, said packing comprising a pair of flexible rings disposed edgewise radially of the coupling member and having free edge portions occupying a diverging relation and engaging the surface of the member which it opposes, and means on the other member for securing the packing means in place, said means comprising relatively adjustable fastening rings between which the flexible packing rings are held.

5. In combination with a pipe section, a coupling member associated therewith overlapping the same, and a packing in the space between the overlapping portions of the pipe section and coupling member, said packing comprising a pair of flexible rings disposed edgewise radially of the coupling member and having free edge portions occupying a diverging relation and engaging the surface of the member which it opposes, and means on the other member for securing the packing means in place, said means comprising fastening rings between which the flexible packing rings are held, an edge portion of the fastening rings being offset or bent inwardly to embed in the flexible packing rings.

6. In combination with a pipe section, a coupling member associated therewith overlapping the same, a packing in the space between the overlapping portions of the pipe section and coupling member, said packing comprising a pair of flexible rings having free edge portions occupying a diverging relation and engaging the surface of the member which it opposes, means on the other member for securing the packing means in place, said means comprising fastening rings between which the flexible packing rings are held, and a buffer interposed between the flexible packing rings adapted to act as a shock absorber under excessive lateral deflection of the pipe section and coupling member.

7. In combination with a pipe section, a coupling member associated therewith overlapping the same, a packing in the space between the overlapping portions of the pipe section and coupling member, said packing comprising a pair of flexible rings having free edge portions occupying a diverging relation and engaging the surface of the member which it opposes, means on the other member for securing the packing means in place, said means comprising relatively adjustable fastening rings between which the flexible packing rings are held, and a buffer adjacent to the flexible packing rings adapted to act as a shock absorber under excessive lateral deflection of the pipe section and coupling member.

8. In combination with a pipe section, a coupling member associated therewith overlapping the same, a packing in the space between the overlapping portions of the pipe section and coupling member, said packing comprising a pair of flexible rings having free edge portions occupying a diverging relation and engaging the surface of the member which it opposes, means on the other member for securing the packing means in place, said means comprising fastening rings between which the flexible packing rings are held, an edge portion of the fastening rings being offset or bent inwardly to embed in the flexible packing rings, and a buffer adjacent to the flexible packing rings adapted to act as a shock absorber under excessive lateral deflection of the pipe section and coupling member.

9. In combination with a pipe section, a coupling member associated therewith, the pipe section and coupling member overlapping, a flexible packing interposed between the overlapped portions of the pipe section and coupling member permitting relative deflection of the pipe section and coupling member, and a buffer also interposed between said overlapped portions adapted to constitute a shock absorber under excessive deflection of the parts.

10. In combination with oppositely disposed pipe sections, means for flexibly connecting the same, comprising a coupling member having a reduced portion at one end and an enlarged portion at its opposite end, one adapted to enter and the other adapted to receive the adjacent ends of the pipe sections, and combined packing and shock absorbing instrumentalities interposed between the overlapped portions of the pipe sections and coupling member, permitting substantial lateral deflection of the pipe sections and preventing the harmful influence of excessive or violent deflection.

11. In combination with oppositely disposed pipe sections, of means for flexibly connecting the same, comprising a coupling member having a reduced portion at one end and an enlarged portion at its opposite end, one adapted to enter and the other adapted to receive the adjacent ends of the pipe sections, and combined packing and shock absorbing instrumentalities interposed between the overlapped portions of the pipe sections and coupling member, permitting substantial lateral deflection of the pipe sections and preventing the harmful influence of excessive or violent deflection, said instrumentalities comprising in each instance flexible packing rings secured to one part and freely engaging the adjacent part, and a buffer ring adjacent to said packing rings.

12. In combination with oppositely disposed pipe sections, of means for flexibly connecting the same, comprising a coupling member having a reduced portion at one end and an enlarged portion at its opposite end, one adapted to enter and the other adapted to receive the adjacent ends of the pipe sections, and combined packing and shock absorbing instrumentalities interposed between the overlapped portions of the pipe sections and coupling member, permitting substantial lateral deflection of the pipe sections and preventing the harmful influence of excessive or violent deflection, said instrumentalities comprising in each instance flexible diverging packing rings secured to one part and freely engaging the adjacent part, and a buffer ring adjacent to said packing rings.

13. In combination with oppositely disposed pipe sections, of means for connecting the same, comprising a coupling member having a reduced portion at one end and an enlarged portion at the opposite end, an outwardly exposed packing carried by the reduced end of said member, an inwardly exposed packing carried by the enlarged end thereof adapted to engage the adjacent pipe sections, the packing being formed to permit longitudinal movement of the pipe sections and coupling member, and means for resisting such longitudinal movement.

14. In combination with oppositely disposed pipe sections, of means for connecting the same, comprising a coupling member having a reduced portion at one end and an enlarged portion at the opposite end, an outwardly exposed packing carried by the reduced end of said member, an inwardly exposed packing carried by the enlarged end thereof adapted to engage the adjacent pipe sections, the packing being formed to permit longitudinal and rocking movement of the pipe sections and coupling member, and means for resisting such longitudinal movement and acting to contract the parts referred to.

15. In combination with oppositely disposed pipe sections, of means for connecting the same, comprising a coupling member having a reduced portion at one end and an enlarged portion at the opposite end, an outwardly exposed packing carried by the reduced end of said member, an inwardly exposed packing carried by the enlarged end thereof adapted to engage the adjacent pipe sections, the packing being formed to permit longitudinal and rocking movement of the pipe sections and coupling member, and means for resisting such longitudinal movement and acting to contract the parts referred to, said means comprising springs connected to one of the pipe sections and to the coupling member.

16. In combination with oppositely disposed pipe sections, of means for connecting the same comprising a coupling member having a reduced portion at one end and an enlarged portion at the opposite end, an outwardly exposed packing carried by the reduced end of said member, an inwardly exposed packing carried by the enlarged end thereof adapted to engage the adjacent pipe sections, the packing being formed to permit longitudinal and rocking movement of the pipe sections and coupling member, and means for resisting such longitudinal movement and acting to contract the parts referred to, said means comprising springs connected to one of the pipe sections and to the coupling member, and additional springs between said coupling member and the other pipe section.

17. In combination with a pipe section, a coupling member associated therewith overlapping the same, a packing in the space between the overlapping portions of the pipe section and coupling member, said packing comprising a pair of flexible rings disposed edgewise radially of the coupling member and having free edge portions occupying a diverging relation and engaging the surface of the member which it opposes, means on the other member for securing the packing means in place, said means comprising fastening rings between which the flexible packing rings are held, and a buffer adapted to act as a shock absorber under excessive lateral deflection of the pipe section and coupling member.

18. The combination with sections of pipe to be joined, of an intermediate floating coupling ring of sinuous formation, providing end portions of relatively different diameters, and flexible packing rings having free projecting portions of cupped or dished formation at the opposite end portions of the coupling interposed between the respective outer and inner surfaces of said end portions and the corresponding inner and outer surfaces of the pipe sections.

19. The combination with sections of pipe to be joined, of an intermediate floating coupling ring of sinuous formation provided with terminal portions of relatively different diameters, and flexible packing wings having projecting free portions of cupped or dished formation at the terminal portions of the coupling interposed between the respective outer and inner surfaces of said portions and the corresponding respective inner and outer surfaces of the pipe sections.

20. The combination with sections of pipe to be joined, of an intermediate floating coupling ring, and flexible packing members having free projecting portions of cupped or dished formation at the opposite end portions of the coupling arranged between the coupling and the adjoining pipe sections, a free edge of the packing facing in the general direction of the outlet end of the pipe and exposed to the pipe contents, substantially as described.

21. The combination with sections of pipe to be joined, of a flexible packing member interposed therebetween having a free projecting portion of cupped or dished formation, a free edge of the packing facing in the general direction of the outlet end of the pipe and being exposed to the pipe contents.

In testimony whereof I affix my signature in presence of two witnesses.

EDWARD F. BERRY.

Witnesses:
J. E. JOHNSON,
P. KLING.

Copies of this patent may be obtained for five cents each, by addressing the "Commissioner of Patents, Washington, D. C."